3,703,394
FORM BOARD COATED WITH A POROUS POLYMER FILM AND A FORM OIL, SAID FILM CHARACTERIZED BY HAVING SOLID PARTICLES DISTRIBUTED THERETHROUGH
Charles B. Hemming, Brewster, N.Y., and Edward L. Bernholz, Danbury, Conn., assignors to Champion International Corporation, New York, N.Y.
No Drawing. Continuation-in-part of application Ser. No. 505,060, Oct. 24, 1965. This application Sept. 19, 1969, Ser. No. 861,546
Int. Cl. B44d 1/20; B29c 1/04
U.S. Cl. 117—5.1          13 Claims

ABSTRACT OF THE DISCLOSURE

The present invention is concerned with a reusable form board of any material, such as wood, plywood, hardboard, cement-asbestos or other fibrous board, and a porous polymer coating, with or without solid materials, preferably microspheres, used with an oil coating applied to the board either before or after the plastic coating, or as a blend of the plastic coating and oil.

---

The present invention is concerned with a reusable form board of any material, such as wood, plywood, hardboard, cement-asbestos or other fibrous board, and a porous polymer coating, with or without solid materials, preferably microspheres, used with an oil coating applied to the board either before or after the plastic coating, or as a blend of the plastic coating and oil.

The present application is a continuation in part of application S.N. 505,060, filed Oct. 24, 1965, which issued as Pat. No. 3,468,690 on Sept. 23, 1969 (corresponding Canadian application S.N. 950,175) which in turn is a continuation in part of U.S. Pat. No. 3,240,618, granted Mar. 15, 1966 (corresponding Canadian Pat. No. 750,889, and British Pat. No. 993,941).

The present invention is broadly concerned with an improved board and specialized coatings for utilization as a concrete and hydraulic cement molding or forming board and with its method of manufacture. The invention is more particularly concerned with an improved concrete form board of any materials, shape or construction which has increased mechanical strength and life, and which will impart to the formed concrete a very desirable uniformly smooth surface. The form board of this invention has greatly improved parting or separation characteristics and, thus, may be readily and easily removed and separated from the hardened concrete with no deleterious effects either on the cement or on the board.

The present concrete form board is further characterized by having a factory or field applied unique plastic coating, which coating is hard and yet flexible. The coating is slightly porous, has a high resistance to damage by impact as well as abrasion resistance. It will very effectively resist the effects of water and chemicals, such as the various alkalies and the like which are encountered in concrete work. In essence, the improved panels of the present invention comprise a fibrous, cement-asbestos or other type board coated or impregnated with an oil, preferably a hydrocarbon oil, and surfaced either before or after oiling, with a polymer coating, preferably a urethane or an epoxy type coating, or a combination of these two types, or a blend of the oil and the polymer. The polymer coating, such as, for example, an epoxy coating or urethane coating, may contain solid particles, preferably microspheres, and has a very desirably porosity. For convenience, and to eliminate repetition, as used hereinafter, urethane includes epoxy and equivalent coatings and vice versa.

It is well known in the art that in concrete work it is essential that the forming or restraining bodies which mold the concrete until it has set be of certain characteristics. It is desirable that these forming materials have the required strength in order to avoid distortion of the heavy concrete and after the concrete has set, these forming materials or forming members be readily removable from the concrete without surface damage to either the cement or to the forming board. If damage results to the surface of the concrete, it is necessary to refinish the cement surface which requires additional materials and time-consuming labor. On the other hand, if the board is damaged, it cannot be re-used since the surface of the subsequent set concrete will be rough at the damaged areas and would have to be refinished. Thus, many various proposals have been made as to what types of material are satisfactory and desirable so as not to cause damage either to the cement surface or to the forming material. Also, as pointed out, it is very desirable that the forming material be of the character that it will impart to the cement surface a smooth uniform surface so as to give a pleasing appearance and also eliminate the necessity for further surface work on the concrete by masons.

For example, one type of wood surfacing material that has been used in the past has been conventional plywood panels which have been surface treated with various mold releasing agents as, for example, a paraffinic type oil. These paraffinic type oils are produced from paraffin crudes and generally have a viscosity in the range from about 10 to 30° SAE. A preferred gravity is one that has an SAE viscosity of about 20°.

In accordance with the present invention, an improved concrete forming panel is prepared which has a longer life than those panels heretofore used, and furthermore produces a smooth pleasing finish on the formed concrete. Furthermore, the panel of the present invention has a parting or separation action which outlasts the mechanical life of the plywood which permits its reuse many many times without further treatment. The panel of the present invention imparts to the formed concrete a very desirable gloss and velvety smooth surface without staining of the concrete. These panels likewise are also attractive as a well-varnished piece of finished wood and are highly resistant to alkalies, abrasion, and impact. Furthermore, the factory coating imparted to the plywood panel has excellent adhesion and will not peel or otherwise deteriorate under adverse conditions or under extended use. These panels do not collect dirt, and are clean thereby giving them a pleasing appearance and making them clean handling. A very desirable feature of the present invention is that the panels may be readily repaired in the field if defects are encountered.

The plywood boards may be any type of plywood. However, the preferred type of plywood forming board is a Douglas Fir plywood as defined in "Douglas Fir Plywood Commercial Standard CS45–60 (Tenth edition-Supersedes CS45–55) Section One-A Revised Nov. 14, 1960."

Thus, one preferred plywood panel of the present invention comprises an exterior, B–B grade Douglas Fir plywood panel manufactured to the required thickness as, for example, in the range from ⅜" to ⅞", preferably ⅝" in thickness. The inner ply may comprise a C grade of ply of the desired thickness. While the preferred panel is an exterior B–B grade Douglas fir, it is to be understood that other grades of fir plywood may be utilized, as for example, Grades A, C, D, and the like.

Even though softwood plywoods are mentioned throughout, the more expensive hardwood plywoods can also be used. Actually, any kind of plain surface (or even textured surfaces, if desired) may be used, such as, lumber, fiberboards and hardboards of different densities, and even particle boards, insulation boards, and cement-asbestos boards; the latter three type performing less efficiently than the other types.

The board is trimmed and sanded and then oiled in a conventional manner with a "form oil." The oil may be applied to the panel in any desirable manner, such as by spraying or by dipping, so as to secure the desired coating or impregnation of the panel.

The form oil is preferably a paraffinic type hydrocarbon oil having an SAE viscosity in the range from about 10 to 30, an A.P.I. gravity of 20° to 30°, and a flash in the range from about 315° to 330° F. One satisfactory oil for treating the panel comprises a "pale oil" having the following specifications:

| | |
|---|---|
| A.P.I. gravity at 60° F. | 25.5–26.2 |
| Flash (Cleveland Open Cup) ° F | 315–330 |
| Fire point ° F | 355–370 |
| Viscosity saybolt universal seconds: | |
| 100° F. | 90–110 |
| 210° F. | 38.3 |
| Pour point ° F | −35 to −50 |
| Color ASTM | 1½ to 2 |
| Carbon residue | .10 |
| Viscosity index | 25 |

The major fields of use in the concrete industry are high rise buildings, bridges, and highways, single and multiple dwelling foundations and light commercial construction.

Panels using this treatment are far superior to other products either from a cost standpoint or quality standpoint. For example, "Plyform" (American Plywood Association trademark) is low priced, but requires reoiling after each use. Likewise medium density and high density overlaid plywood needs cleaning and re-oiling after each pour. Form oils and waxes are low cost solutions, but are applied in the field and are good for one release only. Liquid coatings (relatively expensive) are field applied lacquers which require no oiling. Coating is good for three to four uses, but then must be reapplied. More expensive, field applied epoxies will last for the life of the panel, but require oiling after the initial three pours and each pour thereafter. Self-oiling epoxy coating, such as "Shell Form T" (Shell Chemical Company trademark) is a field applied epoxy coating with a dry film 6 to 8 mils thick. The coating lasts for the life of the panel and possibly requires no re-oiling. However, the cost of the coating alone is twenty cents a square foot.

As mentioned above, any method of coating or impregnating may be used, but a unique method of applying the urethane coating has been developed. This involves spraying the resin and catalyst from separate spray guns mounted so that they mix at the panel surface. This method of application reduces the drying time of urethane coating from fifteen to six minutes, allowing the coated panels to be stacked as they leave the finishing line.

The panel of the present invention has greatly improved characteristics over panels which have been treated either with polyurethane alone or with form oil alone. For example, tests have shown that if the polyurethane is applied to unoiled plywood, not more than four pourings of concrete may be made against the polyurethane finish before hang-up begins to occur, and as a matter of fact, only the first and second partings are reasonably clear. Thus, the form board and the method of manufacture as described herein is unique in that no adhesion was expected to be obtained in applying the polyurethane to oiled plywood, and secondly, having obtained adhesion, it was not expected that continual parting could be secured between the form board and the concrete without further reoiling. These findings, as well as others, are disclosed in detail in my above previous Canadian Pat. No. 750,889 (corresponding to U.S. Pat. No. 3,240,618) and U.S. 3,468,690, all incorporated herein.

VARIABLES OF POTENTIAL IMPORTANCE

A study of various parameters in my manufactured product has led to the conclusion that inadequate oiling or insufficient oil retention during prolonged storage could cause concrete hang-up.

No practical improvement in release was found, as mentioned in column 4, when the dry urethane film was made thicker than 4 mils. Excellent results have been obtained when the thickness of the film, with or without dissolved oil, is in the range of 1 mil to 4 mils.

Release of successive pours was tested against 4′ x 4′ faces spaced 8″ apart, using Transit-Mix air entraining concrete with a 3–5 slump. Each pour volume was about 0.5 yds.$^3$ in size. Many other smaller experimental pours of 0.5 ft.$^3$ units were made as well. Tests were made using "Lubriform" plywood panels (trademark of U.S. Plywood-Champion Papers Inc. for panels made using this invention). Results would be identical on any wood or plywood so treated.

Results obtained:

(a) 2 mil vs. 4 mil urethane coating: There appeared to be no practical improvement in release when the dry urethane film was made thicker; the appearance of both 2 mil and 4 mil surfaces was equivalent.

(b) Curtain coated vs. air sprayed: No great differences in surface appearance between curtain coated and air sprayed urethane films could be observed on finished Lubriform under the microscope. Concrete release experiments indicated that a multiplicity of pores in the urethane surface was desirable, but that the mode of application of the urethane prepolymer was not significant. Theoretically, air spraying assists materially in the development of desired pore structures in the film.

(c) Efficiency of a second oiling of the plywood panel before urethane coating, as opposed to incorporation of oil in the prepolymer: Unquestionably, a greater oil reserve is built up within a Lubriform panel by a second oiling step. At least 1.5 grams/ft.$^2$ can be applied in this way. If, however, 9% of oil (based on urethane solids) is present in a 2 mil film, only 0.3 gram/ft.$^2$ becomes additionally available. Because of considerations of optimum pore structure, this value can be halved. Therefore, a second oiling operation becomes necessary and is a vital manufacturing step for insuring clean release of the concrete. Obviously, oil may also be incorporated in the prepolymer as well as using two or even more oiling operations. The economics of the situation is the only limiting factor.

(d) Definitions—Spenkel B86–50CX (Spencer Kellogg trademark): The American Society for Testing Materials has proposed a definition for one-package moisture cured urethane coatings. "These are characterized by the presence of free isocyanate groups and are capable of conversion to useful films by the reaction of these isocyanate groups with ambient moisture." (Proposed definition, type 2.)

Another definition has been proposed for a two-package, prepolymer/catalyst system. "These comprise systems wherein one package contains a prepolymer or adduct having free isocyanate groups capable of forming useful films by combining with a relatively small quantity of catalyst accelerator or cross-linking agent such as a monomeric polyol or polyamine contained in a second package. These systems have limited pot life after the two components are mixed." (Proposed definitions, type 4.)

Both of these definitions encompass the nature of the urethane system applied to my concrete form board. The commercial preparation, Spencer Kellogg Spenkel M86–50CX, can be utilized as either a type 2 or a type 4 urethane coating. A lubricating oil (SAE 10 to SAE 50) may be dispersed in the prepolymer to the extent of 2–10% based upon prepolymer solids. Optimum oil level is 5% in this application. The optimum SAE value is 10.

The above Spenkel M86–50 CX has certain properties indicated by its formula. "M" indicates it is moisture cured. "50CX" shows that it contains 50% non-volatile materials, and that the solvents consist of equal parts by weight of Cellosolve (Union Carbide Corporation trademark) acetate and xylene.

Other properties of Spenkel M86–50CX are the following: weight per gallon: 8.5–8.7 lbs.; percent isocyanate: —3.8% minimum, 4.2% average; percent free toluene diisocyanate, less than 1%; drying time, 15 minutes at 120° F. and 65% relative humidity without a catalyst.

(e) Effect of catalyst and dissolved oil upon release properties: Six percent Dabco (Houdry Process and Chemical Company trademark) catalyst can be applied to the prepolymer film former, M86–50CX. The catalyst is triethylenediamine, and may readily be dissolved in n-butyl acetate. The 6% figure, based upon urethane solids, has in practice proved to be an upper limit. 2–3% by weight of catalyst is sufficient. When sprayed as a two-part system, and dried at ambient room temperature in midsummer, a 2 mil film is "block-proof" under 20 lbs./in.$^2$ pressure in 20 minutes when stacked face to back. If 6% catalyst is added to M86–50CX, pot life is under one hour. This is too short a time for mill processing. The catalyst has no obvious effect on concrete release capability of Lubriform.

When Mobil Lubrite (Mobil Oil Company of New York trademark) SAE 10 oil is dissolved in M86–50CX, it appears to aid pore formation in the urethane film. As moisture curing at the reactive isocyanate centers occurs, the oil is spewed out. The film then cures "plump," and a thin layer of oil "pools" upon the outer surface. The pore channels also permit the passage of oil from wood fibrils in the upper plies to the surface of the cured film. This effect is clearly visible under the microscope, for as pressure is applied two inches from the optical field with a knife edge, the oil can be seen coursing out of the fibrils and thence through the pores.

The upper limit of oil saturation for M86–50CX with Mobil Lubrite SAE 10W is 12.5% on urethane solids. It was discovered, however, that using 9% of oil in the prepolymer led to reduced adhesion strength after cure. Therefore, the figure of 5% was found to be optimum. This amount of oil in the film resulted in good pour formation. Excellent panel surface appearance after the third release was observed when a 0.5 yd.$^3$ block was cast.

(f) Effect of re-oiling Lubriform by application of oil within a high boiling carrier solvent: Mobil Lubrite SAE 10W oil was dispersed in a high flash naphtha, 1:1 by weight. This mixture was applied to a Lubriform surface which seemed "oil-poor" after three pours. 12 grams/ft.$^2$ was added to the releasing surface, but the next or fourth release was disappointing. No serious hang-up occurred, but concrete frosting was well above the average. Since M86–50CX is itself an oil modified urethane it appears that the carrier solvent caused some softening of the urethane film, and consequent encapsulation of sand and calcined particles. This approach was therefore abandoned.

(g) Oil distribution gradient, if any, within successive plies: The question as to whether oiling could be effective only within the face and back veneers because of the blocking of oil penetration into the interior plies by the glue lines was investigated. Hexane extractions of each ply of the five plies in ⅝" Lubriform indicated that the applied oil was almost evenly distributed through the thickness of the panel. Voids of appreciable size undoubtedly occur in the glue line. In addition, exterior glues, such as Monsanto, Exterior Formula PF 303W (Monsanto Corporation trademark), contain about 40% total solids when applied (any exterior grade phenol formaldehyde resin bonded plywood would perform similarly). Of this 40%, fully one-third consists of Furafil (Quaker Oats Company trademark), wheat flour, blood extender and alkalis. These materials are oil permeable to some extent, particularly if they are not entirely encapsulated by the polymerized phenolic resin solids. Experimentally, oil migration into the inner plies was noted when samples of ¾" Douglas fir plywood adsorbed up to 15% of their weight in SAE 10 and SAE 50 lubricating oils. When a 2" x 2" specimen was cut through the center after three days of oil saturation from the uppermost surface, oil was clearly present in the center ply. We conclude that oil saturation can reach a practical equilibrium in a matter of two to four days, and that the oil reservoir is not confined to the oiled plies.

(h) Effect of oil viscosity upon ease of panel saturation: The discussion of the previous section (g) is applicable here. Mobilube (Mobil Oil Company of New York trademark) 90–GX, Mobil Lubrite SAE 10W, Mobil Lubrite SAE 40 and Mobil Lubrite SAE 50 will all saturate plywood used for Lubriform to the same degree and at nearly the same rate. Mobil Lubrite SAE 10W undoubtedly moves into the fibrils at an observably faster, but hardly more significant rate. The relative effect of each grade upon release properties is the same.

(i) Effect of different oils and oil levels upon pore structure of urethane film: Desirable pore structure, which helps good release by permitting free oil passage from the interior of the panel, is aided by incorporating a limited amount of oil into the M86–50CX prepolymer. The discussion in section (e) is applicable here. Mobil Lubrite SAE 10W is more readily soluble in M86–50CX because of its more comparable viscosity. Mobilube 90–GX is satisfactory in aiding concrete release but is a less soluble additive to the prepolymer.

The oils of higher viscosity seem to impart a lard-like "feel" to Lubriform after a concrete release. Pore structure remains acceptable but some clouding of the film is evident. Furthermore, some loss of adhesion strength occurs. This effect was most notable for Mobilube 90–GX and for Vaseline (Chesebrough-Ponds Inc. trademark). It is also probable that detergent additives in Mobilube 90–GX and incompatibility of M86–50CX with Vaseline tend to retard curing of the urethane prepolymer.

(j) Effect of differing cement formulations on Lubriform release: No appreciable difference ascertained.

MECHANISM OF RELEASE

While not all details are clear, the release mechanism is visualized in this way:

As the concrete mix is poured and vibrated, the silica, lime, alumina and magnesia become hydrated. Heat is released, and trapped air bubbles expand. Water forms in a film around the air bubbles and in turn separates from the oil-water interface at the form surface as hydration proceeds. The oil at the surface becomes more fluid, and is forced through the urethane pores into the wood fibrils. The combination of heat of hydration and hydrostatic pressure causes this "reverse flow" of oil into the wood. Water having a higher surface tension than oil, flows through the pores less easily.

As the primary hydration comes to an end, the concrete cools. Trapped air bubbles contract or are forced out of the shrinking concrete mass, which begins to develop internal cohesive strength. The urethane pores contract somewhat, and as water becomes chemically bound within the silicate-aluminate molecules, a partial vacuum is formed in the cellular concrete structure at the urethane interface. To restore the equilibrium of the low pressure areas, atmospheric pressure tends to force oil out of the wood fibrils and through the urethane pores at the concrete interface. The more oil that is present in the reservoir of saturated wood fibrils, the more readily does it flow out as a partial vacuum acts at the pores. Furthermore a larger oil reservoir will tend to increase the number of successful releases.

It is assumed a complex interaction of physical forces such as surface tension, viscosity, electrostatic charges, dipole moments and hydrogen bonding occurs in this mechanism. However, the relative importance of these molecular properties in release is difficult to assess.

The ionic nature of the alkaline hydroxides, $Ca(OH)_2$ and $Mg(OH)_2$ results in partial dissociation and in formation of a moderate excess of hydroxyl ions in water solution. Such mild alkaline conditions are unlikely to damage the urethane film at the

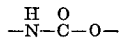

linkage. The hydroxyl ions are far more likely to neutralize other acidic components, such as polyphenols from the wood or air entraining phenolic resins. The oil molecules, which have considerable molecular chain length and more widely distributed electrostatic charges, are less likely to hold water of neutralization by hydrogen bonding. Also, the aluminate and silicate salts have a greater affinity for water than for cellulose. A reaction resulting in the formation of ionic crystalline hydrates goes more to completion than does the relatively weak hydrogen bonding of water to cellulose. In the same way, hydrogen bonding to the oil molecules or to the urethane film is negligible.

However, the importance of a sufficient oil reserve within the Lubriform panel has been demonstrated. As the oil contributes to clean release, so does the water-repellent, tough, adherent and semi-porous urethane film protect the wood substrate.

CHEMICAL CONSIDERATIONS

The effect of moisture curing upon the development of maximum hardness must be considered. At the same time, a distinction must be made between "set" and "tack free." The term "set" means that the prepolymer film has ceased to flow. "Tack free" means that the film is no longer sticky to the touch. After set time has been concluded, we have found that manufactured concrete form panels can be stacked face to back without "blocking," or tearing the applied film when one panel is removed from another in the stacking pile. At 77° F. a 3-mil wet film, cast at 50% solids, dries in this way. At 30% relative humidity set, ½ hr.; tack free, 2 hrs. At 50% R.H., set, ½ hr.; tack free, 1½ hrs. At 75% R.H., set, ¼ hr.; tack free, 1 hr.

The addition of Dabco catalyst speeds the set time. Dabco is a tertiary amine. Its chemical name is 1,4-diazo (2,2,2) bicyclooctane whose structure is well known. Dabco's catalytic effect is more powerful than would be predicted from its base strength. It is observed that the configuration of the molecule is such that the nitrogen atoms are not sterically hindered, permitting it to form a transition state complex more readily. For example, triethylenediamine catalyzes the phenyl isocyanate-butanol reaction at 70° C. in dioxane solution more rapidly than triethylamine and N-methyl morpholine. The ratio of catalytic activity calculated at 1.0 mole percent of catalyst in this reaction is as follows:

Triethylenediamine _____ [1] 110
Triethylamine _____ 7.5
N-methyl morpholine _____ 4.0
No catalyst _____ 1.0

[1] Known as 1,4 diaza (2-2-2) bicyclooctane.

This reaction can also be catalyzed by other materials than tertiary amines. Isocyanate-hydroxyl reactions have been accelerated by such materials as dibutyltin diacetate, dibutyltin dilaurate, lead oleate, lithium acetate, stannic chloride, dibutyltin sulfide, cadmium nitrate, ferrocene (dicyclopentadienyliron), triphenyl antimony, zirconium naphthenate, tributyl phosphine and many others. Some, though not all, can accelerate the isocyanate and water reaction. In general, metallic naphthenates of lead, zinc, cobalt, copper, nickel and manganese can be used, often in conjunction with Dabco (triethylenediamine). The film applied to our concrete form material may be regarded also as a thin foam. In moisture curing of this film, the reaction product is an isocyanate-terminated urethane prepolymer. The reaction of the isocyanate-terminated urethane prepolymer with water is then carried out in my production process.

It is clear that the amount of humidity supplied will affect the rate of cure. Also the increase or decrease of molecular weight or change in structure of R and $R_1$ in this chemical formula will change the properties of the coating.

A variety of reactants can be used to obtain many different prepolymers. In general, Tolylene diisocyanate (TD1)
or
diphenyl methane 4,4'-diisocyanate (MD1)
or
3,3' toluidene 4,4'-diisocyanate (TOD1) glycerin+
or
polyethers
or
castor oil
or
——————————— Prepolymers castor oil derivatives
or
many polyols The polyols may be such materials as neopentyl glycol, 1,5-pentanediol, 1,4-butanediol or 1,3-butanediol. Diols and triols may be used to increase flexible if desired.

Often a diol, a triol and TD1 will be used to strike an appropriate balance of coating properties. The mol percent ratios will be:

$$\frac{diol}{triol}=\frac{1}{1}, \frac{TD1}{triol}=\frac{4.25}{1}$$

If the TD1/triol ratio exceeds 4.5, then residual NCO will be irritating and possibly toxic. If this ratio is much less than 4.0, gelation of the prepolymer will occur, giving poor pot life.

If an epoxy composition be used as the coating, it can be applied by spraying on by a direct roll coater. Since the pot life of this mixture is limited, the application should be made within about 1 hour. The resin can be applied by a "twin gun" assembly, such that the resin, oil, and microspheres are applied from one gun and the catalyst, such as V–25 (Shell Chemical Company trademark), is applied from the other gun.

In addition to the satisfactory "pale oil" mentioned in column 3, lines 1 to 15 above, another very desirable oil is Mobil Lubrite* SAE 10W as set forth in column 5 above. It is preferred that the oiled substrate be impregnated in the range of 3 to 12 grams, such as about 8 grams, of oil per square foot of surface area. Preferably the oil should soak thoroughly into the wood. Also the surface must be cleanly wiped so that no oil film remains on the surface before the coating, such as the epoxy composition, is applied to the cellulosic substrate.

The present invention is primarily concerned with a form coating composition, preferably an epoxy (or urethane) resin coating and oil, and preferably with solid or hollow particles such as microspheres.

An Epon 828 (Shell Chemical Company trademark) resin is cured with 33–133% by weight of V–25 curing agent, with an optimum level of 75–100% curing agent applied to a wood or other cellulosic substrate that has been oiled with SAE 10W.

Epon Resin 828 has a viscosity of 100–160 poises at 25° C. and an epoxide equivalent (grams of resin containing one gram equivalent of epoxide) of 185–192. It has a typical molecular weight of 380 and a density of 1.168 g./ml. at 20° C.

The curing agent can be V–25 or V–40 (Shell Chemical Company trademarks). Both materials are of the polyamide type, and have a gel time of 45–60 minutes at 77° F. when mixed at 33–133 parts with 100 parts of Epon resin. Other curing agents can be used for faster cures, but V–25 and V–40 are more readily available or more easily handled due to lower toxicity and odors. These secondary curing agents are diethylenetriamine-triethylenetetramine, Curing Agent D, Curing Agent T–1, or diethylaminopropylamine.

A typical curing or polymerization reaction is as follows:

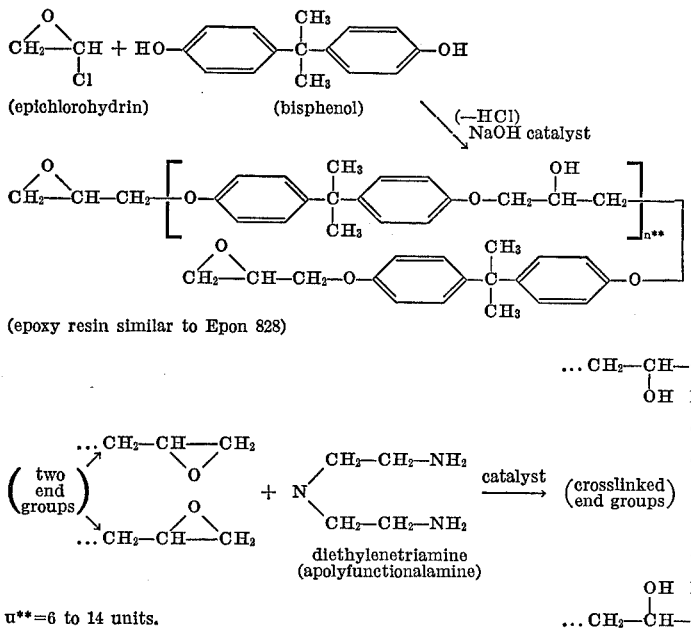

(epoxy resin similar to Epon 828)

u**=6 to 14 units.
n**=6 to 14 units.

Satisfactory coating compositions of the epoxy type are as follows:

| | Specific, parts weight | Range |
|---|---|---|
| Shell Epon | 100 | 100 |
| Shell V-25 curing agent | 100 | 33–133 |
| Mobile lubrite SAE 10W | 7.5 | 2–10 |
| Dow Resin CX–4520.0 microspheres | 12.5 | 2.5–15.0 |

NOTE.—Polyolefinic materials, such as Oletac 100 (Sun oil company trademark), can be substituted for DOW Resin CX-4520.1 (The Dow Chemical Company trademark).

The Epon 828 resin is mixed with the V–25 curing agent on a 1:1 weight basis as described. Then, 2–10% of Mobil Lubrite SAE 10W is added to the mixture, with the optimum value being 5–7.5% of oil. Next, a weight of dry microspheres, amounting to 2.5–15% by weight of the epoxy curing agent-oil mixture, is added. These microspheres, designated as Dow Resin CX–4520.1, consist of 90–94% vinylidene chloride and 6–10% acrylonitrile copolymer, and have an average size of 8 microns at room temperature. When heated to 250°–320° F., the spheres expand to an average size of 30 microns under the influence of an encapsulated liquid blowing agent.

See Dow's U.S. Pat. 3,449,194, "Process of Laminating Wood Using Vinylidene Chloride Acrylo Nitrile Copolymer Latex Based Adhesives," inventor N. E. Scheffler, et al., which patent is incorporated by reference herein. Caution must be exercised in keeping the temperature below 160° F. when drying out or reducing the moisture level of the microspheres from approximately 25% to an optimum range of 1–3%. The reason for this precaution is the fact that at temperatures exceeding 160° F., the microspheres will be partially or completely degraded or pyrolyzed.

The effect of the microspheres is very beneficial, since they add resiliency to the coating. Since the microspheres are filled with a liquid blowing agent, they act as little polyolefinic cushions. The tough epoxy matrix makes the coating durable, but the film of oil around the microspheres affords lower frictional forces at the interface of the board and the setting concrete. Also, the wood or cellulosic substrate is waterproofed more fully, making the formboard more durable for this stated purpose of many successive concrete releases.

It is within the concept of the invention to use dispersed particles of polyolefinic materials such as polyethylene, polypropylene, polyvinyl chloride, polyvinyl fluoride and other like polymers. The microspheres used can be replaced by solid or hollow spheres ranging in size from two microns to 250 microns. As long as the materials are somewhat resilient, and do not add too greatly to the viscosity of the spraying solutions, they can be more resilient than solid ones, and will be used more effectively as fillers and anti-slip agents on a volume basis.

As an example, Oletac 100, a polyolefinic white solid in crumb form supplied by Sun Oil Company, can be finely ground to an impalpable powder, and then be incorporated into the system described. Because it is a waxy material, Oletac 100 will require grinding at low temperatures, below its softening point of 149°–167° F. Oletac 100 is an amorphous polypropylene crumb, containing on the average about one double bond per molecule.

Other finely divided olefinic materials are available from U.S. Industrial Chemicals, and are described in this company's Bulletin PTD 42–1065 which is incorporated herein by reference.

Microspheres and finely divided polyolefins may be used as fillers in oil-modified urethanes as well as with epoxies.

The combined coating material can be applied at 1–4 mils in dry, cured thickness, with the optimum value being 2.0–2.5 mils. It is noted that the coating will give the characteristic toughness of an epoxy film after being cured at 150° F. for one hour. Faster cures can be effected at temperatures up to 200° F. or by hot air impingement ovens. Warm air velocities of the order of 2000 to 4000, such as 3000 cubic feet per minute, will also speed the curing/drying process.

The releasing surface developed has very desirable characteristics for a concrete form board. It is quite tough, and yet is resilient. The "spewing out" of the oil is less pronounced than in the "Lubriform" or plain urethane system.

Thus the form board of the present invention such as a cured 2 mil filled epoxy coating over plywood or like substrate that has been oiled, for example, at 12 grams of oil per square foot, is characterized by (1) greater durability of releasing surface, (2) excellent release characteristics for concrete, (3) more dimensional stability for the substrate, particularly if it is plywood, (4) better resistance to alkaline degradation of coating surface than for oiled plywood (Plyform), (5) very slightly porous film structure, though not as porous as Lubriform urethane film, which permits light lubrication of concrete parting interface and does not undergo serious depletion of the parting oil reserve, (6) releasing surface which possesses toughness, yet is cushioned by many spherical filler particles within the epoxy matrix.

The increased film toughness avoids the problems of continuous polyolefinic films, which can be scratched and scored by sand particles in wet, freshly poured concrete. The polyolefinic films will gradually become loaded with embedded siliceous particles. However, the epoxy film is tougher, and the microspheres or polyolefinic filler particles are made more discontinuous. The merits of polyolefins as release agents are therefore reinforced by the added oil at the parting interface, and the epoxy film resists scoring or scratch damage more strongly. However, the oil still migrates slowly to the releasing surface, thus giving the oil-water parting interface that is required in concrete release. Also the oil reservoir is depleted more slowly, and less oil is transferred to the surface of the concrete.

It is thus seen that an important invention has been made to concrete form boards and improved coatings therefor as further set forth in the attached claims.

The embodiments of the invention in which an exclusive property or privilege is claimed are defined as follows:

1. A fibrous board coated with a porous polymer film having a thickness in the range from about 1 to 4 mils and with a form oil, said form oil being a paraffinic type hydrocarbon oil having an SAE viscosity in the range from about 10 to 30, said film being characterized by having dispersed microspheric particles of solid polyolefinic materials distributed therethrough, said film acting as a releasing agent when said board is used to mold concrete.

2. Board as defined by claim 1 wherein said form oil is applied to said board and said film is applied over said form oil.

3. Board as defined by claim 1 wherein said form oil is applied in a concentration of about 3 to 12 grams of oil per square foot of surface area.

4. Board as defined by claim 1, wherein said film is selected from the class consisting of polyurethane film and epoxy resin film.

5. Board as defined by claim 1 wherein said polyolefinic materials range in size from about 2 to 250 microns and are selected from the class consisting of polyethylene, polypropylene, polyvinyl chloride and polyvinyl fluoride.

6. Fibrous board as defined by claim 1 wherein the sizes of said microspheric particles are in the range from about 2 to 250 microns.

7. Fibrous board as defined by claim 6 wherein the average sizes of said microspheric particles are about 8 microns.

8. Board as defined by claim 1 wherein said dispersed microspheric particles have a film of oil about the said particles.

9. A fibrous board as defined by claim 1 wherein said microspheric particles are hollow.

10. A fibrous board as defined by claim 1 wherein said microspheric particles are solid spheres.

11. A form panel comprising a fibrous board substrate having adhered thereto a film of form oil and having adhered thereto an epoxy resin characterized by having dispersed microspheric solid particles of polyolefinic materials distributed therethrough.

12. Panel as defined by claim 11 wherein said microspheric solid particles consist of about 90–94% vinylidene chloride and 6–10% acrylonitrile.

13. Improved panel which comprises a fibrous board characterized by having at least one surface coated with form oil and wherein a porous epoxy film containing form oil in an amount of 2 to 12½% therein based upon prepolymer solids is adhered to the oil coated surface, said film characterized by having dispersed microspheric solid particles of polyolefinic materials distributed therethrough, and wherein said panel is hardboard and said oil is a paraffinic type hydrocarbon oil having an SAE viscosity in the range from about 10 to 30 grade, A.P.I. gravity in the range from about 10 to 30, and a flash point in the range from about 315° to 330° F.

References Cited

UNITED STATES PATENTS

| | | | |
|---|---|---|---|
| 2,432,002 | 12/1947 | Frederick et al. | 117—5.1 X |
| 2,316,752 | 4/1943 | Atkinson et al. | 117—5.1 X |
| 2,772,986 | 12/1956 | Buck | 117—5.1 X |
| 2,846,742 | 8/1958 | Wagner | 117—5.1 X |
| 2,863,364 | 12/1958 | Holger et al. | 117—5.1 X |
| 2,944,821 | 7/1950 | Mason | 117—161 X |
| 3,003,191 | 10/1961 | Luth | 117—5.1 X |
| 3,058,839 | 10/1962 | Kemp | 117—72 |
| 3,104,984 | 9/1963 | Reck et al. | 117—148 |
| 3,165,483 | 1/1965 | Gemeinhardt et al. | 260—33.6 |
| 3,211,674 | 10/1965 | Sandrique | 117—148 X |
| 3,240,618 | 3/1966 | Hemming | 117—5.1 |
| 3,254,563 | 6/1966 | DeVries et al. | 117—161 |
| 3,277,052 | 10/1966 | Thompson et al. | 260—33.6 |
| 3,393,173 | 7/1968 | Berry | 260—33.6 |
| 3,407,165 | 10/1968 | Oepkes et al. | 260—33.6 X |
| 3,438,929 | 4/1969 | Appel | 260—33.6 |
| 3,427,178 | 2/1969 | Zakim et al. | 117—5.1 |
| 3,433,753 | 3/1969 | Farkas et al. | 260—33.6 |
| 3,449,274 | 6/1969 | Salensky | 260—18 |
| 3,468,690 | 9/1969 | Hemming | 117—5.1 |

WILLIAM D. MARTIN, Primary Examiner

M. R. P. PERRONE, JR., Assistant Examiner

U.S. Cl. X.R.

117—72, 76 P, 76 T, 148, 155 R, 161 KP, 161 ZB; 161—159, 90; 260—2.5 AY, 2.5 EP, 33.6 UB, 33.6 EP